US009696170B2

United States Patent
Tanizaki et al.

(10) Patent No.: US 9,696,170 B2
(45) Date of Patent: Jul. 4, 2017

(54) ROUTE CALCULATION SYSTEM, ROUTE CALCULATION METHOD, AND COMPUTER PROGRAM

(71) Applicant: AISIN AW CO., LTD., Anjo-shi, Aichi-ken (JP)

(72) Inventors: Daisuke Tanizaki, Okazaki (JP); Katsuhiko Mutsuga, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/908,874

(22) PCT Filed: Aug. 25, 2014

(86) PCT No.: PCT/JP2014/072086
§ 371 (c)(1),
(2) Date: Jan. 29, 2016

(87) PCT Pub. No.: WO2015/029917
PCT Pub. Date: Mar. 5, 2015

(65) Prior Publication Data
US 2016/0187152 A1    Jun. 30, 2016

(30) Foreign Application Priority Data

Aug. 29, 2013   (JP) .................. 2013-177586

(51) Int. Cl.
*G01C 21/00* (2006.01)
*G09B 29/00* (2006.01)
(Continued)

(52) U.S. Cl.
CPC ....... *G01C 21/3492* (2013.01); *G01C 21/343* (2013.01); *G01C 21/3415* (2013.01);
(Continued)

(58) Field of Classification Search
CPC ........ G01C 21/00; G09B 29/00; G09B 29/10; G08G 1/0969
(Continued)

(56) References Cited

U.S. PATENT DOCUMENTS

2007/0162224 A1*  7/2007  Luo ................. G01C 21/3614
                                                  701/414
2010/0114471 A1   5/2010  Sugiyama et al.
(Continued)

FOREIGN PATENT DOCUMENTS

EP    1 357 359 A1   10/2003
JP    2000-074682 A   3/2000
(Continued)

OTHER PUBLICATIONS

Jul. 22, 2016 Supplementary European Search Report issued in European Patent Application No. 14839076.8.
(Continued)

*Primary Examiner* — Tan Q Nguyen
(74) *Attorney, Agent, or Firm* — Oliff PLC

(57) ABSTRACT

Route setting systems, methods, and programs set a guide route from a departure location to a destination location, display the set guide route on a display superimposed on a map image, receive an operation by a user designating a location on the displayed map image, acquire a road status of a road in the vicinity of the designated location, and select a pass-through road on the basis of the acquired road status. The pass-through road is a road by which the guide route will pass from the road in the vicinity of the designated location. The systems methods, and programs change the set guide route to a route that leads from the departure location to the destination location by way of the selected pass-through road.

14 Claims, 6 Drawing Sheets

(51) Int. Cl.
*G01C 21/34* (2006.01)
*G01C 21/36* (2006.01)
*G09B 29/10* (2006.01)

(52) U.S. Cl.
CPC ..... *G01C 21/3614* (2013.01); *G01C 21/3664* (2013.01); *G01C 21/3676* (2013.01); *G09B 29/005* (2013.01); *G09B 29/106* (2013.01)

(58) Field of Classification Search
USPC ................................ 701/414, 438, 439, 431
See application file for complete search history.

(56) References Cited

U.S. PATENT DOCUMENTS

| | | | |
|---|---|---|---|
| 2011/0224896 A1* | 9/2011 | Napieraj | G01C 21/3614 701/532 |
| 2012/0053836 A1 | 3/2012 | Iaccarino | |
| 2014/0088870 A1* | 3/2014 | Varoglu | G01C 21/3664 701/533 |
| 2014/0129976 A1* | 5/2014 | Beaurepaire | G01C 21/367 715/788 |

FOREIGN PATENT DOCUMENTS

| | | |
|---|---|---|
| JP | 2005-283211 A | 10/2005 |
| JP | 2008-232740 A | 10/2008 |
| JP | 2010-256069 A | 11/2010 |
| WO | 2008/117712 A1 | 10/2008 |

OTHER PUBLICATIONS

Nov. 25, 2014 Search Report issued in International Application No. PCT/JP2014/072086.

* cited by examiner

FIG. 2

VICS INFORMATION (DISTRIBUTED: 14:01, August 6, 2013)

| LINK NUMBER | DESCRIPTION |
|---|---|
| 1000012 | CONGESTED |
| 1006756 | CLOSED WITH ACCIDENT |
| 1039897 | CROWDED |
| ... | ... |

| OPERATION TIME T | MAGNITUDE RELATIONSHIP AMONG $\alpha$, $\beta$, AND $\gamma$ |
|---|---|
| LONG | $\alpha > \beta = \gamma$ |
| ⇕ | $\alpha = \beta = \gamma$ |
| SHORT | $\alpha < \beta = \gamma$ |

| TOUCH PRESSURE P | MAGNITUDE RELATIONSHIP AMONG $\alpha$, $\beta$, AND $\gamma$ |
|---|---|
| HIGH | $\alpha > \beta = \gamma$ |
| ⇕ | $\alpha = \beta = \gamma$ |
| LOW | $\alpha < \beta = \gamma$ |

FIG. 8
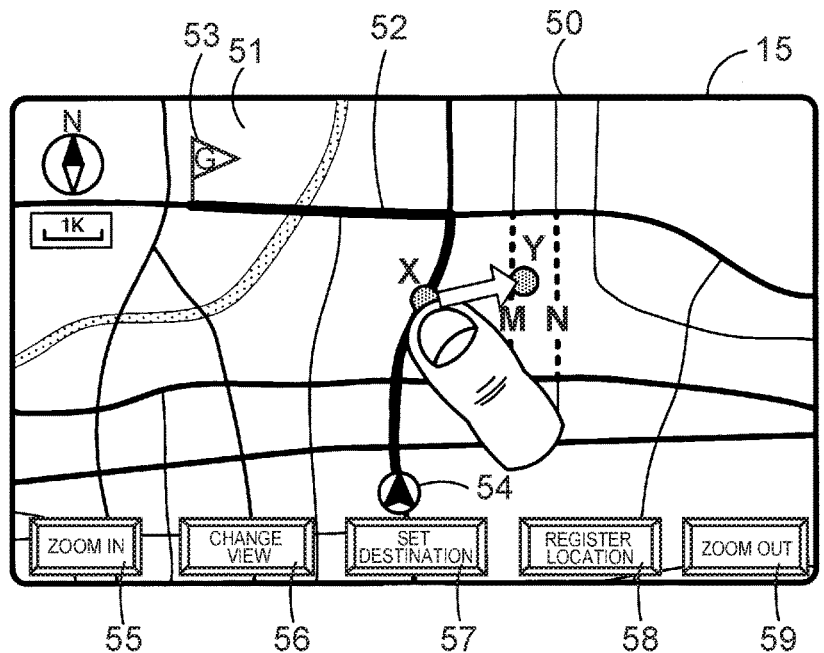
GUIDE ROUTE IS CHANGED
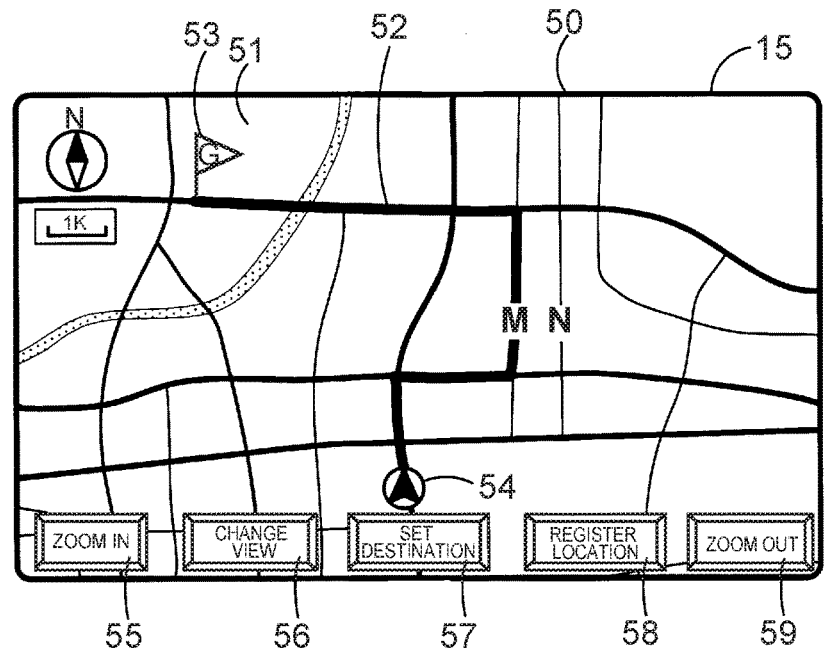

ROUTE CALCULATION SYSTEM, ROUTE CALCULATION METHOD, AND COMPUTER PROGRAM

TECHNICAL FIELD

Related technical fields include route calculation systems, methods, and programs that allow setting and changing of a guide route from a departure location to a destination location.

BACKGROUND

In recent years, many vehicles are provided with a navigation apparatus that provides travel guidance for the vehicle to allow a driver to easily reach a desired destination location. The navigation apparatus is a device that can detect the current position of the vehicle using a GPS receiver or the like and acquire map data corresponding to the current position from a storage medium such as a DVD-ROM or an HDD or through a network to display the map data on a liquid crystal monitor. Further, such a navigation apparatus is provided with a route calculation function for calculating an optimum route from the vehicle position to a desired destination location when the destination location is input, and adapted to set the optimum route found in the calculation as a guide route, display the guide route on a display screen, and provide audio guidance in the case where the vehicle approaches an intersection or the like in order to reliably guide a user to the desired destination location. In recent years, in addition, some cellular phones, smartphones, tablet terminals, personal computers, and so forth also have functions that are similar to those of the navigation apparatus described above.

In the navigation apparatus etc. described above, in addition, a guide route that has once been set is changed on the basis of an operation by a user. For example, International Patent Application Publication No. 2008/117712 proposes a technology in which, when a user performs a touch operation on a guide route displayed on a display and thereafter performs a drag operation, the guide route is changed to a route that passes through the end location of the drag operation by the user. The publication also discloses that the guide route is changed to a route that passes through the end location of the drag operation by the user and that least deviates from the original route.

SUMMARY

In the technology according to International Patent Application Publication No. 2008/117712 described above, however, the guide route is changed to a route that passes through the end location of the drag operation by the user, and thus the guide route is occasionally changed to a route that passes through a road near the end location of the drag operation by the user even in the case where such a road is congested or subjected to a traffic restriction such as road closure, lane closure, and tire chain restriction. As a result, the guide route may be changed to a route that is not suitable for travel by the user.

Exemplary embodiments of the broad inventive principles described herein have an object to provide a route calculation system, a route calculation method, and a computer program that can provide an appropriate guide route to a user by changing a guide route in consideration of the road status of nearby roads.

Exemplary embodiments a route calculation system that changes a guide route from a departure location to a destination location that has once been set on the basis of an operation by a user, a route calculation method for calculating a guide route using the system, and a computer program that causes the system to implement the following components. Specifically, there are provided: route setting means for setting a guide route from a departure location to a destination location; route display means for displaying the guide route set by the route setting means on a display device as superimposed on a map image; operation reception means for receiving an operation by a user for designating a location on the map image displayed on the display device; road status acquisition means for acquiring a road status of a road in the vicinity of the location, the road being located in the vicinity of the designated location designated by the operation by the user received by the operation reception means; pass-through road selection means for selecting a pass-through road, by way of which the guide route is to pass, from the road in the vicinity of the location, on the basis of the road status of the road in the vicinity of the location acquired by the road status acquisition means; and route change means for changing the guide route set by the route setting means to a route that leads from the departure location to the destination location by way of the pass-through road selected by the pass-through road selection means.

With the route calculation system, the route calculation method, and the computer program configured as described above, in the case where a guide route that has once been set is changed on the basis of an operation by a user, a road, by way of which the guide route after a change is to pass, is selected in consideration of the road status of roads in the vicinity of a location designated by the user. Thus, the guide route can be changed to an appropriate route that complies with the intention of the user also in consideration of the road status.

BRIEF DESCRIPTION OF THE DRAWINGS

FIG. 2 illustrates an example of VICS information stored in a road status information DB.

FIG. 8 illustrates a specific example of a guide route change process of the route change processing program.

DETAILED DESCRIPTION OF EXEMPLARY EMBODIMENTS

A route calculation system, embodied as a navigation apparatus, according to an embodiment will be described in detail below with reference to the drawings. First, a schematic configuration of a navigation apparatus 1 according to the embodiment will be described with reference to FIG. 1.

Figure 1:
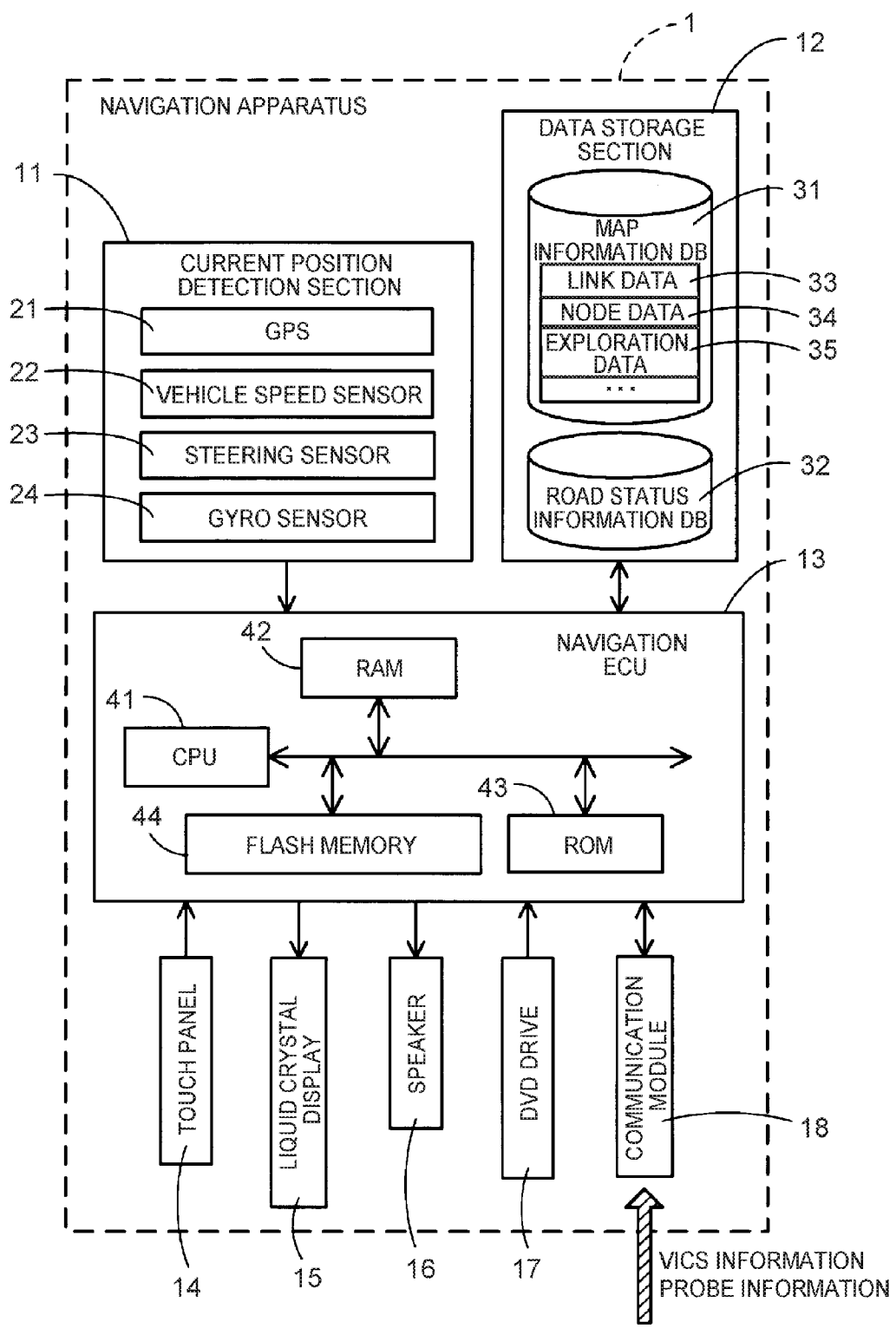
FIG. 1 is a block diagram illustrating the configuration of a navigation apparatus according to an embodiment.

FIG. 1 is a block diagram illustrating the navigation apparatus 1 according to the embodiment.

As illustrated in FIG. 1, the navigation apparatus 1 according to the embodiment is composed of: a current position detection section 11 that detects the current position of the vehicle on which the navigation apparatus 1 is mounted; a data storage section 12 that stores various data; a navigation ECU 13 that performs various computation processes on the basis of input information; a touch panel 14 that receives an operation from a user; a liquid crystal display 15 that displays, to the user, a map of an area in the vicinity of the vehicle, route information on a route found in an calculation through a route calculation process to be discussed later, and so forth; a speaker 16 that outputs audio route guidance; a DVD drive 17 that reads a DVD that serves as a storage medium; and a communication module 18 that communicates with an information center such as a probe center and a VICS (registered trademark: Vehicle Information and Communication System) center.

The constituent elements of the navigation apparatus 1 will be described below in order.

The current position detection section 11 is composed of a GPS 21, a vehicle speed sensor 22, a steering sensor 23, a gyro sensor 24, and so forth, and can detect the current position of the vehicle, the orientation, the travel speed of the vehicle, the current time, and so forth. In particular, the vehicle speed sensor 22 is a sensor for detecting the travel distance of the vehicle and the vehicle speed, and generates pulses in accordance with rotation of the drive wheels of the vehicle to output a pulse signal to the navigation ECU 13. The navigation ECU 13 counts the generated pulses to calculate the rotational speed of the drive wheels and the travel distance. It is not necessary that the navigation apparatus 1 should include all of the four sensors, and the navigation apparatus 1 may be configured to include only one or some of such sensors.

The data storage section 12 includes: a hard disk (not illustrated) that serves as an external storage device and a storage medium; and a recording head (not illustrated) that serves as a driver that reads a map information DB 31, a road status information DB 32, a predetermined program, and so forth stored in the hard disk and writes predetermined data into the hard disk. (As used herein the term "storage medium" is not intended to encompass transitory signals.) The data storage section 12 may be constituted of a memory card or an optical disk such as a CD or a DVD in place of the hard disk. The map information DB 31 may be stored in an external server to be acquired by the navigation apparatus 1 through communication.

The map information DB 31 is storage means for storing link data 33 on roads (links), node data 34 on node points, calculation data 35 for use in processes for calculating a route and changing the route, facility data on facilities, map display data for displaying a map, intersection data on intersections, search data for searching for a location, and so forth, for example.

The stored link data 33 include: for links composing a road, data representing the width of the road to which the link belongs, gradient, cant, bank, road surface state, number of lanes of the road, location at which the number of lanes is reduced, location at which the width is reduced, a railroad crossing, and so forth; for corners, data representing the radius of curvature, an intersection, a T junction, an entrance to and an exit from the corner, and so forth; for road attributes, data representing an ascending road, a descending road, and so forth; and for road types, data representing a general road such as a national road, a prefectural road, and a narrow street, and a toll road such as a national express highway, an urban expressway, an ordinary toll road, and a toll bridge.

The stored node data 34 include: the coordinate (position) of a branch point (including an intersection, a T junction, etc.) of actual roads and a node point set every predetermined distance in accordance with the radius of curvature etc. on the roads; the node attribute representing whether the node is a node corresponding to an intersection or the like; a connected link number list which is a list of the link numbers of links connected to the node; an adjacent node number list which is a list of the node numbers of nodes that are adjacent to the node via a link; and data on the height (altitude) of each node point.

The stored calculation data 35 include various data for use in a route calculation process for calculating a route from a departure location (e.g. the current position of the vehicle) to a set destination location as discussed later, and a route change process for changing the route found in the calculation on the basis of an operation by the user. Specifically, the stored calculation data 35 include cost calculation data used to calculate an calculation cost such as a cost (hereinafter referred to as an "intersection cost") obtained by digitalizing the degree of suitability of an intersection for a route and a cost (hereinafter referred to as a "link cost") obtained by digitalizing the degree of suitability of a link composing a road for a route.

The intersection cost is set for each node corresponding to an intersection included in the route serving as the object for calculation of the calculation cost, and calculated in accordance with the presence or absence of a traffic signal, the travel route (that is, whether the vehicle travels straight ahead, makes a right turn, or makes a left turn) of the vehicle when passing through the intersection, and so forth.

The link cost is set for each link included in the route serving as the object for calculation of the calculation cost, and calculated on the basis of the length of the link and in consideration of the road attribute, road type, road width, number of lanes, traffic status, etc. of the link.

The road status information DB 32 is storage means for storing information (hereinafter referred to as "road status information") indicating the current road status acquired from an external VICS center or probe center. Examples of the road status include a traffic status and a road surface state of a road. Examples of the traffic status include, besides congestion that occurs on a road, traffic restriction such as road closure, lane closure, and tire chain restriction and traffic disturbance such as a disabled vehicle, an accident, and construction. Examples of the road surface state include a frozen road surface. For example, as illustrated in FIG. 2, the VICS information specifies a section in which congestion currently occurs, and a section in which an accident, construction, or the like occurs.

The navigation ECU (electronic control unit) 13 is an electronic control unit that controls the entire navigation apparatus 1, and includes a CPU 41 that serves as a computation device and a control device, and internal storage mediums such as a RAM 42 that is used as a working memory when the CPU 41 performs various computation processes and that stores route data, an intersection list, time slice data, etc. when an calculation of a route is performed, a ROM 43 that stores a control program, a route change processing program (see FIG. 3) to be discussed later, and so forth, and a flash memory 44 that stores a program read from the ROM 43. The navigation ECU 13 constitutes various means as process algorithms. For example, route setting means sets a guide route from a departure location to a destination location. Route display means displays the guide route set by the route setting means on the liquid crystal display 15 as superimposed on a map image. Operation reception means receives an operation by a user for designating a location on the map image displayed on the liquid crystal display 15. Road status acquisition means acquires a road status of roads in the vicinity of the location, the roads being located in the vicinity of the designated location designated by the operation by the user received by the operation reception means. Pass-through road selection means selects a pass-through road, by way of which the guide route is to pass, from the roads in the vicinity of the location, on the basis of the road status of the roads in the vicinity of the location acquired by the road status acquisition means. Route change means changes the guide route set by the route setting means to a route that leads from the departure location to the destination location by way of the pass-through road selected by the pass-through road selection means. Operation time acquisition means acquires a time for which the operation by the user for designating the designated location received by the operation reception means is performed. Pressure acquisition means acquires a touch pressure on a touch panel for a touch operation by the user received by the operation reception means.

The touch panel 14 is disposed in front of the display region of the liquid crystal display 15, and operated to scroll the map image, select a button disposed in the display region, perform an operation for changing the guide route as discussed later, and so forth. The navigation ECU 13 detects a "touch on", which is transition from the state in which the user does not touch the touch panel 14 to the state in which the user touches the touch panel 14, and a "touch off", which is a transition from the state in which the user touches the touch panel 14 to the state in which the user does not touch the touch panel 14, on the basis of a detection signal output from the touch panel 14 when the touch panel 14 is operated. The navigation ECU 13 also detects a touch coordinate, which is the coordinate of a location touched by the user, and a change in touch coordinate caused upon receiving an operation (that is, a drag operation or a flick operation) of moving the position of the touch with an object to be selected such as a map image or a button selected. The navigation ECU 13 further detects a touch pressure applied when the user touches the touch panel 14. The navigation ECU 13 performs control in order to execute various operation corresponding to the detected touch operation, touch coordinate, and so forth.

Operation means such as a tablet may be used in place of the touch panel 14 as operation means for receiving a touch operation by the user.

The liquid crystal display 15 displays a map image including roads, traffic information, operational guidance, an operation menu, key guidance, a guide route from a departure location to a destination location, guidance information on a travel along a guide route, news, weather forecasts, the time, mails, television programs, and so forth. An HUD or an HMD may be used in place of the liquid crystal display 15.

The speaker 16 outputs audio guidance on a travel along a guide route and guidance on traffic information on the basis of an instruction from the navigation ECU 13.

The DVD drive 17 is a drive that can read data stored in a storage medium such as a DVD and a CD. Music and images are reproduced, the map information DB 31 is updated, etc. on the basis of the read data.

The communication module 18 is a communication device that receives traffic information etc. transmitted from a traffic information center such as the VICS center or a probe center, for example, and may be a cellular phone or a DCM, for example.

Figure 3:
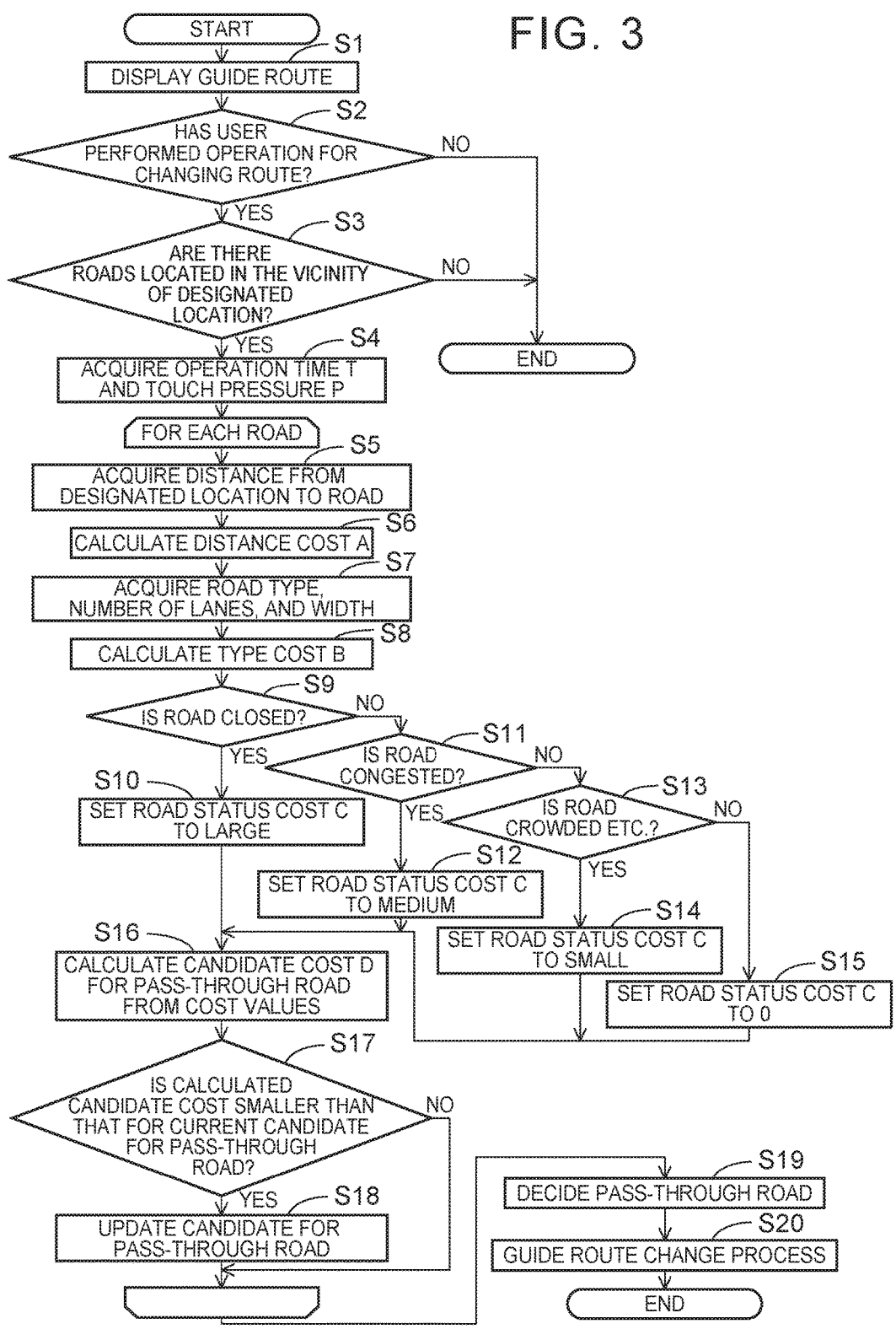
FIG. 3 is a flowchart of a route change processing program according to the embodiment.

Subsequently, a route change processing program executed by the CPU 41 of the navigation apparatus 1 according to the embodiment configured as described above will be described with reference to FIG. 3. FIG. 3 is a flowchart of the route change processing program according to the embodiment. The route change processing program is a program executed after a guide route is set in the navigation apparatus 1 to change the set guide route on the basis of an operation by the user. The program may be executed immediately after a guide route is set in the navigation apparatus 1, or may be executed at any timing after a guide route is set and before it is determined that the user has reached a destination location. The program illustrated in the flowchart of FIG. 3 described below is stored in the RAM 42 or the ROM 43 of the navigation apparatus 1, and executed by the CPU 41.

In the route change processing program, first, in step (hereinafter abbreviated as "S") 1, the CPU 41 displays a guide route currently set in the navigation apparatus 1 on the liquid crystal display 15. The guide route is a recommended route from a departure location to a destination location set by the navigation apparatus 1. The navigation apparatus 1 provides travel guidance such as an instruction for a right or left turn on the basis of the set guide route. A Dijkstra's algorithm known in the art is used to set a guide route. The link cost and the intersection cost discussed above are used to calculate a route. The departure location may be the current position of the user, or may be a desired location (e.g. home) selected by the user.

Figure 4:
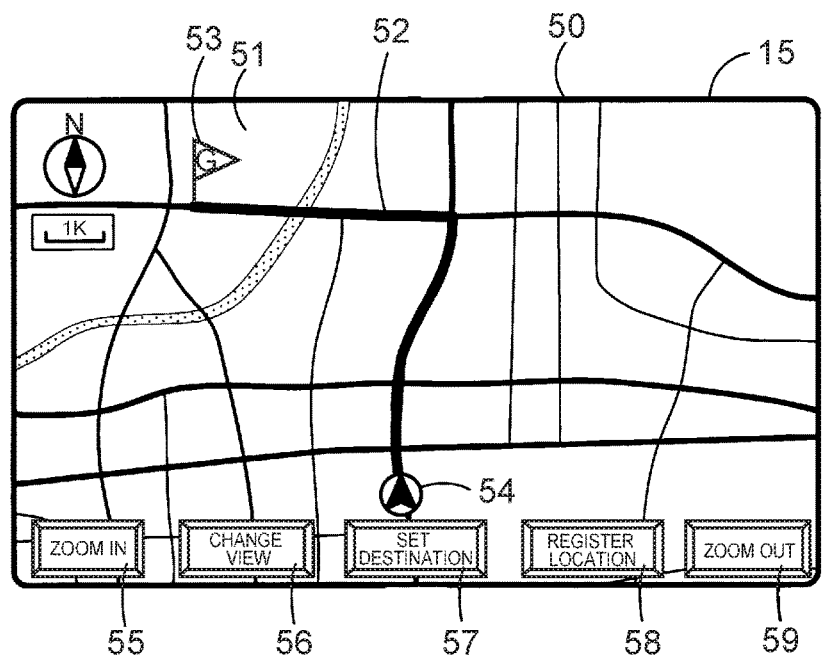
FIG. 4 illustrates a travel guide screen displayed on a liquid crystal display immediately after a guide route is set.

In the case where the guide route set in the navigation apparatus 1 is displayed on the liquid crystal display 15, the guide route is displayed as superimposed on a map image of an area in the vicinity of the guide route. FIG. 4 illustrates a travel guide screen 50 displayed on the liquid crystal display 15 immediately after the guide route is set in the navigation apparatus 1. The travel guide screen 50 includes a map image 51 of an area in the vicinity of the current position of the vehicle, a guide route 52, a destination location 53, a vehicle position mark 54 that indicates the current position of the vehicle matched with the map, and various buttons 55 to 59 that are selectable to cause the navigation apparatus 1 to execute predetermined functions. In the example illustrated in FIG. 4, the departure location of the guide route 52 is the current position of the vehicle. The user can reference the travel guide screen 50 to grasp the facility information and the road shape in the vicinity of the current vehicle position, the currently set guide route, and so forth.

Next, in S2, the CPU 41 determines, on the basis of a signal transmitted from the touch panel 14, whether or not an operation by the user for changing the guide route has been received. Examples of the operation by the user for changing the guide route include a drag operation by the user performed with a location on the guide route displayed on the liquid crystal display 15 as the start point. In the case where the drag operation is received, the end point of the drag is determined as the designated location designated by the operation by the user. The designated location serves as the reference location when selecting a pass-through road for the guide route after a change as discussed later.

Figure 5:
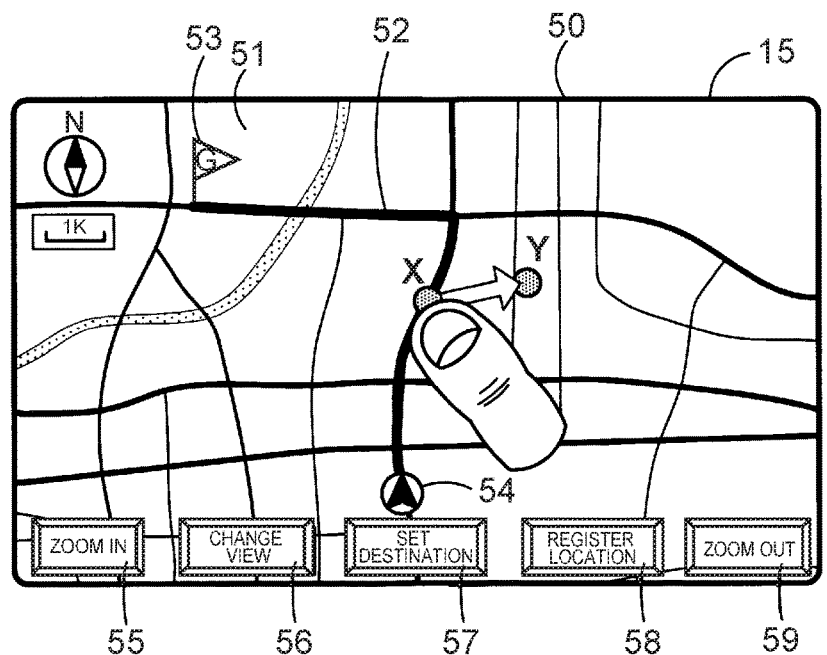
FIG. 5 illustrates an example of an operation by a user for changing the guide route.

For example, in the case where the guide route 52 is displayed on the liquid crystal display 15 as illustrated in FIG. 5, and when the user touches on at a location X on the guide route 52 displayed on the liquid crystal display 15, thereafter drags to a location Y, and touches off at the location Y, the CPU 41 determines that an operation by the user for changing the guide route has been received. Then, the location Y is specified as the designated location.

The operation by the user for changing the guide route may be an operation other than the drag operation. For example, the operation may be a flick operation performed on the map image with a location on the guide route as the start point. In this case, the location of a touch off of the flick operation is determined as the designated location. Alternatively, the operation may be a touch operation performed on the map image. In this case, the location of a touch of the touch operation is determined as the designated location.

In the case where it is determined that an operation by the user for changing the guide route has been received (S2: YES), the process proceeds to S3. In the case where it is determined that an operation by the user for changing the guide route has not been received (S2: NO), in contrast, the route change processing program is ended.

Subsequently, in S3, the CPU 41 determines whether or not there are roads in the vicinity of the designated location designated by the operation by the user for changing the guide route.

In the case where it is determined that there are roads in the vicinity of the designated location (S3: YES), the roads determined to be located in the vicinity of the designated location are specified as roads in the vicinity of the location, and the process proceeds to S4. In the case where it is determined that there are no roads in the vicinity of the designated location (S3: NO), in contrast, the route change processing program is ended without changing the guide route.

The roads located in the vicinity of the designated location are roads included within a predetermined distance (e.g. within 1 km) from the designated location. The determination in S3 is basically made in the unit of link of the road. That is, it is determined in S3 whether or not there are links in the vicinity of the designated location, and links determined in S3 to be located in the vicinity of the designated location are specified as roads in the vicinity of the location. Links, a part of which is included within the predetermined distance from the designated location, may be determined as roads in the vicinity of the location, or links, the entirety of which is included within the predetermined distance from the designated location, may only be determined as roads in the vicinity of the location. It is desirable that the predetermined distance should be set as appropriate in accordance with the scale of the map displayed on the liquid crystal display 15. For example, the predetermined distance is set to be shorter as the scale of the displayed map is larger.

Figures 6, 7:
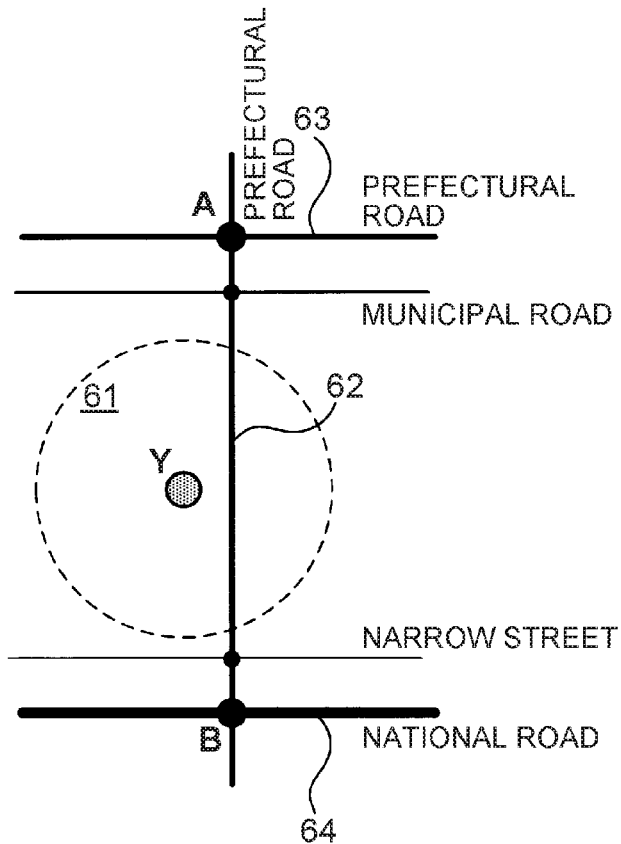
FIG. 6 illustrates a method of specifying roads in the vicinity of a location.
FIG. 7 illustrates an operation time T, a touch pressure P, and the magnitude relationship among coefficients $\alpha$, $\beta$, and $\gamma$ to be set.

Alternatively, the determination in S3 may be made in the unit of section divided by intersections, rather than in the unit of link of the road. It is desirable that the intersections that divide such sections should be intersections with a road of the same or higher standard (e.g. a prefectural road, a national road, and a highway for a prefectural road) so as to exclude intersections (e.g. an intersection between a narrow street and a main road) that are not suitable for passage of vehicles as much as possible. For example, as illustrated in FIG. 6, in the case where the location Y is specified as the designated location, a prefectural road 62 included in an area 61 within a predetermined distance from the location Y is specified as the road in the vicinity of the location. In this event, a section of the prefectural road 62 between an intersection A with a prefectural road 63 and an intersection B with a national road 64, which are of the same or higher standard, is specified as the road in the vicinity of the location.

In the case where it is determined that there are roads located in the vicinity of the designated location (S3: YES), the process proceeds to S4. In the case where it is determined that there are no roads in the vicinity of the designated location (S3: NO), in contrast, the route change processing program is ended without changing the guide route.

In S4, the CPU 41 acquires, on the basis of a signal transmitted from the touch panel 14, a time T for which the user designated the designated location, in particular, in the operation by the user for changing the guide route received by the navigation apparatus 1. For example, in the case where the drag operation illustrated in FIG. 5 is received as the operation by the user for changing the guide route, the CPU 41 acquires the time for which a touch of the designated location Y had been continued in S4. In S4, in addition, the CPU 41 also acquires a touch pressure P on the touch panel 14 applied when the operation by the user for changing the guide route was performed.

The following processes in S5 to S18 are executed for each road in the vicinity of the location determined in S3 to be located in the vicinity of the designated location designated by the operation by the user for changing the guide route. That is, in the case where there are a plurality of roads in the vicinity of the location, the following processes in S5 to S18 are repeatedly executed for each of the plurality of roads in the vicinity of the location, and the process proceeds to S19 after the processes in S5 to S18 are executed for all the roads in the vicinity of the location.

First, in S5, the CPU 41 acquires the distance from the designated location to the road in the vicinity of the location serving as the object to be processed. The distance acquired in S5 may be the shortest distance from the designated location to the road in the vicinity of the location (that is, the distance from the designated location to a location closest to the designated location, in the road in the vicinity of the designated location), may be the longest distance from the designated location to the road in the vicinity of the location (that is, the distance from the designated location to a location farthest from the designated location, in the road in the vicinity of the designated location), or may be the average distance of the shortest and longest distances.

Next, in S6, the CPU 41 calculates a distance cost A on the basis of the distance from the designated location to the road in the vicinity of the location serving as the object to be processed, which has been acquired in S5. The distance cost A is used to select a pass-through road for the guide route after a change as discussed later. The CPU 41 calculates the distance cost A so as to be smaller as the distance from the designated location to the road in the vicinity of the location serving as the object to be processed is shorter. As a result, a road in the vicinity of the location at a shorter distance from the designated location is more preferentially selected as the pass-through road in the subsequent processes.

Subsequently, in S7, the CPU 41 acquires the road type, the number of lanes, and the width of the road in the vicinity of the location serving as the object to be processed on the basis of the link data 33 stored in the map information DB 31.

Next, in S8, the CPU 41 calculates a type cost B on the basis of the road type, the number of lanes, and the width of the road in the vicinity of the location, which have been acquired in S7. As with the distance cost A, the type cost B is used to select a pass-through road for the guide route after a change. The CPU 41 calculates the type cost B so as to be smaller as the road in the vicinity of the location serving as the object to be processed is easier for vehicles to travel through. Whether or not the road in the vicinity of the location is easy for vehicles to travel through is determined on the basis of the road type, the number of lanes, the width, etc. of the road, for example. For example, for the road type, roads of a particular road type with a large road width, such as a prefectural road and a national road, are determined as roads that are easy for vehicles to travel through. For the number of lanes and the width, meanwhile, roads with a large number of lanes or with a large width have a large road width, and are determined as roads that are easy for vehicles to travel through. Thus, the type cost B is calculated so as to be smaller in the case where the road in the vicinity of the location is a prefectural road or a national road than a narrow street. In addition, the type cost B is calculated so as to be smaller as the number of lanes of the road in the vicinity of the location is larger and as the width of the road in the vicinity of the location is larger. As a result, a road in the vicinity of the location that is easier for vehicles to travel through is more preferentially selected as the pass-through road in the subsequent processes.

After that, in S9, the CPU 41 acquires a road status of the road in the vicinity of the location serving as the object to be processed on the basis of the road status information indicating the current road status, the road status information being transmitted from an external VICS center or probe center and stored in the road status information DB 32. The CPU 41 determines whether or not the road status of the road in the vicinity of the location serving as the object to be processed is "closed", in particular.

In the case where it is determined that the road status of the road in the vicinity of the location is "closed" (S9: YES), the CPU 41 calculates a road status cost C as a predetermined value (large) in S10. The predetermined value calculated in S10 is larger than the values calculated in S12 and S14 to be discussed later. As with the distance cost A and the type cost B, the road status cost C is used to select a pass-through road for the guide route after a change.

In the case where it is determined that the road status of the road in the vicinity of the location is not "closed" (S9: NO), on the other hand, the process proceeds to S11.

In S11, the CPU 41 determines whether or not the road status of the road in the vicinity of the location serving as the object to be processed is "congested", in particular, also on the basis of the road status information indicating the current road status, the road status information being transmitted from an external VICS center or probe center and stored in the road status information DB 32.

In the case where it is determined that the road status of the road in the vicinity of the location is "congested" (S11: YES), the CPU 41 calculates the road status cost C as a predetermined value (medium) in S12. The predetermined value calculated in S12 is smaller than the value calculated in S10, and larger than the value calculated in S14 to be discussed later.

In the case where it is determined that the road status of the road in the vicinity of the location is not "congested" (S11: NO), on the other hand, the process proceeds to S13.

In S13, the CPU 41 determines whether or not the road status of the road in the vicinity of the location serving as the object to be processed indicates a state with an event that affects travel of the vehicle other than "closed" and "congested" also on the basis of the road status information indicating the current road status, the road status information being transmitted from an external VICS center or probe center and stored in the road status information DB 32.

Specifically, examples of such an event include a case where the congestion degree is "crowded" which is lower than "congested", a case with traffic restriction such as lane closure or tire chain restriction or traffic disturbance such as a disabled vehicle, an accident, or construction, and a case with a frozen road surface etc. In S13, the determination may be made for only a particular event, rather than for all the events described above. For example, the CPU 41 may be configured to determine only whether or not the road status of the road in the vicinity of the location is "crowded", in particular.

In the case where it is determined that the road status of the road in the vicinity of the location indicates a state with an event that affects travel of the vehicle (S13: YES), the CPU 41 calculates the road status cost C as a predetermined value (small) in S14. The predetermined value calculated in S14 is smaller than the values calculated in S10 and S12.

In the case where it is determined that the road status of the road in the vicinity of the location does not indicate a state with an event that affects travel of the vehicle (S13: NO), on the other hand, the process proceeds to S15.

In S15, the CPU 41 calculates the road status cost C as zero. That is, as a result of performing the processes in S9 to S15, a road in the vicinity of the location that is easier for vehicles to travel through has a smaller road status cost, and is more preferentially selected as the pass-through road in the subsequent processes. Thus, it is possible to prevent the guide route from being changed to a route that includes a road that is not suitable for travel by the user such as a closed road and a congested road.

Next, in S16, the CPU 41 calculates a candidate cost D on the basis of the distance cost A calculated in S6, the type cost B calculated in S8, and the road status cost C calculated in any of S10, S12, S14, and S15. The candidate cost D is the final cost that serves as a selection criterion for selecting the pass-through road for the guide route after a change. In the case where there are a plurality of roads in the vicinity of the location, a road in the vicinity of the location with the smallest candidate cost D is selected as the pass-through road.

Specifically, the candidate cost D is calculated using the following expression (1):

$$D = \alpha \times A + \beta \times B + \gamma \times C \tag{1}$$

where $\alpha$, $\beta$, and $\gamma$ are coefficients to be multiplied by the distance cost A, the type cost B, and the road status cost C, respectively. The respective values of the coefficients are set on the basis of one or both of the time (hereinafter referred to as an "operation time") T when the user performed the operation for designating the designated location acquired in S4 and the touch pressure P on the touch panel 14 applied when the operation by the user for changing the guide route was performed.

FIG. 7 illustrates the operation time T, the touch pressure P, and the magnitude relationship among the coefficients $\alpha$, $\beta$, and $\gamma$ to be set. As illustrated in FIG. 7, as the operation time T is longer, $\alpha$ is set to a large value compared to $\beta$ and $\gamma$. That is, as the operation time T is longer, the candidate cost D depends more on the distance cost A (that is, the distance from the designated location to the road in the vicinity of the location). Thus, in the case where the operation time T is longer, the fact that the distance from the designated location is short is given more priority than the road type and the road status in the selection of the pass-through road.

As illustrated in FIG. 7, as the touch pressure P is stronger, $\alpha$ is set to a large value compared to $\beta$ and $\gamma$. That is, as the touch pressure P is stronger, the candidate cost D depends more on the distance cost A (that is, the distance from the designated location to the road in the vicinity of the location). Thus, in the case where the touch pressure P is stronger, the fact that the distance from the designated location is short is given more priority than the road type and the road status in the selection of the pass-through road.

While β and γ have the same value in the example illustrated in FIG. 7, β and γ may be set to different values. In addition, the values of α, β, and γ may be set in consideration of both the operation time T and the touch pressure P, or may be set in consideration of only one of the operation time T and the touch pressure P.

Next, in S17, the CPU 41 determines whether or not the candidate cost D for the road in the vicinity of the location serving as the object to be processed calculated in S16 is smaller than the candidate cost D for the road in the vicinity of the location serving as the current candidate for the pass-through road. In the case where there are a plurality of roads in the vicinity of the location and the process in S17 is performed for the first road in the vicinity of the location, there is no candidate for the pass-through road, and thus the road in the vicinity of the location serving as the object to be processed is inevitably selected as the candidate for the pass-through road.

In the case where it is determined that the candidate cost D for the road in the vicinity of the location serving as the object to be processed calculated in S16 is smaller than the candidate cost D for the road in the vicinity of the location serving as the current candidate for the pass-through road (S17: YES), the process proceeds to S18. In S18, the CPU 41 updates the candidate for the pass-through road to the road in the vicinity of the location serving as the object to be processed. The road in the vicinity of the location that is the candidate for the pass-through road when the processes in S5 to S18 have been performed for all the roads in the vicinity of the location is finally selected as the pass-through road.

In the case where it is determined that the candidate cost D for the road in the vicinity of the location serving as the object to be processed calculated in S16 is larger than or equal to the candidate cost D for the road in the vicinity of the location serving as the current candidate for the pass-through road (S17: NO), on the other hand, the process returns to S5. Then, the processes in and after S5 are executed after the road in the vicinity of the location serving as the object to be processed is changed.

In S19, the CPU 41 finally decides the road in the vicinity of the location that is the candidate for the pass-through road as a result of performing the processes in S5 to S18 for all the roads in the vicinity of the location serving as the pass-through road. In the case where there is a single road in the vicinity of the location, the road in the vicinity of the location is inevitably decided as the pass-through road, and thus the processes in S5 to S18 may be omitted. In the case where the candidate cost D of the road in the vicinity of the location that is the candidate for the pass-through road is significantly large (that is, in the case where it is determined that all the roads in the vicinity of the location are unsuitable as the pass-through road), meanwhile, the pass-through road may not be decided and the guide route may not be changed.

After that, in S20, the CPU 41 changes the guide route currently set in the navigation apparatus 1 on the basis of the road in the vicinity of the location decided as the pass-through road in S19. Specifically, the CPU 41 changes the guide route to a route that leads from the departure location to the destination location by way of the pass-through road.

The departure location and the destination location are the same as those of the guide route before a change. It should be noted, however, that in the case where the vehicle has already started traveling when the guide route is changed and the vehicle is present at a location other than the departure location, the current position of the vehicle is determined as the departure location. Calculation of a new guide route is performed using the link cost and the intersection cost discussed above using a Dijkstra's algorithm known in the art.

Next, a specific example of the guide route change process of the route change processing program described above will be described with reference to FIG. 8.

For example, in the case where the guide route 52 is displayed on the liquid crystal display 15 as illustrated in FIG. 8, and when the user touches on at a location X on the guide route 52 displayed on the liquid crystal display 15, thereafter drags to a location Y, and touches off at the location Y, the CPU 41 selects a road M and a road N, which are located in the vicinity of the location Y as the designated location, as the road in the vicinity of the location. Then, the processes in S5 to S18 are executed to calculate the candidate cost D for each of the road M and the road N. In the case where the candidate cost D for the road M is smaller than that for the road N, for example, the road M is selected as the pass-through road, and the guide route 52 is changed to a route that passes through the road M as illustrated in FIG. 8. As a result, the guide route 52 set in the navigation apparatus 1 can be changed to a route that complies with the intension of the operation by the user.

With the navigation apparatus 1, the route calculation method performed by the navigation apparatus 1, and the computer program executed by the navigation apparatus 1 according to the embodiment, as described in detail above, a guide route set in the navigation apparatus 1 is displayed on the liquid crystal display 15 as superimposed on a map image of a nearby area (S1); in the case where an operation by a user for changing the displayed guide route is received, the road status of roads in the vicinity of the location, which are roads in the vicinity of the designated location designated by the received operation by the user, is acquired, and a pass-through road, by way of which the guide route is to pass, is selected from the roads in the vicinity of the location on the basis of the acquired road status of the roads in the vicinity of the location (S19); and the currently set guide route is changed to a route that leads from a departure location to a destination location by way of the selected pass-through road (S20). Thus, in the case where a guide route that has once been set is changed on the basis of an operation by a user, a road, by way of which the guide route after a change is to pass, can be selected in consideration of the road status of roads in the vicinity of the location designated by the user. As a result, the guide route can be changed to an appropriate route that complies with the intention of the user also in consideration of the road status.

It should be understood that the described embodiments are examples, and that various improvements and modifications may be made without departing from the scope and spirit of the broad inventive principles.

For example, in the embodiment, the current road status of roads in the vicinity of the location is specified on the basis of information received from the VICS center or a probe center. However, the current road status of roads in the vicinity of the location may be predicted and specified on the basis of statistical data obtained by taking statistics on the road status in the past and the current date, time, and weather, for example.

In the embodiment, an operation by the user for changing the guide route is received by the touch panel 14 disposed on the liquid crystal display 15. However, an operation by the user may be received using operation means other than a touch panel. Examples of such operation means include a mouse and a touch pad.

In the embodiment, the road status cost is calculated so as to be the highest in the case where the road status of the road in the vicinity of the location is "closed", and calculated so as to be sequentially smaller in the order of "congested" and "crowded etc." However, the road status cost may be calculated in accordance with more finely divided criteria. For example, the road status cost may be calculated so as to be different for each road status such as lane closure, a frozen road surface, and construction.

The inventive principles may be applied to devices having a route calculation function besides the navigation apparatus. For example, the inventive principles may also be applied to devices such as a cellular phone, a smartphone, a tablet terminal, and a personal computer (hereinafter referred to as a portable terminal etc.). The inventive principles may also be applied to a system composed of a server and a portable terminal etc. In this case, each step of the route change processing program (FIG. 3) discussed above may be performed by any of the server and the portable terminal etc. In the case where the inventive principles are applied to the portable terminal etc., the inventive principles may be applied to mobile bodies other than vehicles such as a user of the portable terminal etc. and a two-wheeled vehicle, for example, of which the route is changed.

While a route calculation system according to a specific embodiment has been described above, the route calculation system may be configured as described below, and the following effect can be achieved in such cases.

For example, a first configuration is as follows.

The road status acquisition means is characterized by acquiring a traffic status or a road surface state of the roads in the vicinity of the location as the road status of the roads in the vicinity of the location.

With the route calculation system configured as described above, it is possible to select a road that is suitable for passage of the guide route, from roads located in the vicinity of the location designated by the operation by the user, as the pass-through road in consideration of the traffic status and the road surface state, in particular. As a result, it is possible to prevent the guide route from being changed to a route that is not suitable for travel by the user.

A second configuration is as follows.

The pass-through road selection means is characterized by selecting the pass-through road with more priority given to a road, from the roads in the vicinity of the location, which is easier to travel through.

With the route calculation system configured as described above, a road that is easy for the user to travel through is preferentially selected as the pass-through road. Thus, it is possible to prevent the guide route from being changed to a route that includes a road that is not suitable for travel by the user such as a closed road and a congested road.

A third configuration is as follows.

The operation reception means is characterized by receiving a drag operation by the user performed with a location on the guide route displayed on the display device as a start point; and an end point of the drag operation is determined as the designated location.

With the route calculation system configured as described above, it is possible to change the guide route by performing an easily understandable operation that suggests a change in guide route on the screen displayed on the display device. In addition, the end location of the drag operation is determined as the designated location. Thus, the designated location can also be specified easily. As a result, the guide route can be changed to a route that better complies with the intention of the user.

A fourth configuration is as follows.

The pass-through road selection means is characterized by selecting the pass-through road also in consideration of a distance from the designated location.

With the route calculation system configured as described above, the pass-through road is selected in consideration of the location designated by the operation by the user. Thus, it is possible to prevent the guide route from being changed to a route that passes by way of a pass-through road that does not comply with the intention of the user.

A fifth configuration is as follows.

The route calculation system is characterized by including operation time acquisition means for acquiring a time for which the operation by the user for designating the designated location received by the operation reception means is performed, in which the pass-through road selection means selects the pass-through road with more priority given to a road at a short distance from the designated location as the time acquired by the operation time acquisition means is longer.

With the route calculation system configured as described above, in the case where the user performs an operation while being strongly aware of the designated location, in particular, the road in the vicinity of the location at a short distance from the designated location can be preferentially selected as the pass-through road by reflecting the intention of the user.

A sixth configuration is as follows.

The route calculation system is characterized in that the operation reception means receives a touch operation on a touch panel by the user and includes pressure acquisition means for acquiring a touch pressure on the touch panel for the touch operation by the user received by the operation reception means; and the pass-through road selection means selects the pass-through road with more priority given to a road at a short distance from the designated location as the touch pressure acquired by the pressure acquisition means is stronger.

With the route calculation system configured as described above, in the case where the user performs an operation while being strongly aware of the designated location, in particular, the road in the vicinity of the location at a short distance from the designated location can be preferentially selected as the pass-through road by reflecting the intention of the user.

A seventh configuration is as follows.

The roads in the vicinity of the location are characterized by being specified in the unit of section divided by intersections with a road of the same or higher standard.

With the route calculation system configured as described above, road sections in an appropriate range, for roads located in the vicinity of the location designated by the operation by the user, can be specified as the roads in the vicinity of the location. Thus, it is possible to prevent a road that does not comply with the intention of the user from being selected as the pass-through road, and to prevent the guide route from being changed to an unnecessarily long route. In particular, if the roads in the vicinity of the location are specified in the unit of section divided by intersections with a road of the same or higher standard, it is possible to prevent the guide route from being changed to a route that is difficult to travel through, such as that including a right or left turn at an intersection between a narrow street and a main road.

An eighth configuration is as follows.

The roads in the vicinity of the location are roads, a part or the entirety of which is included within a predetermined distance from the designated location; and the predetermined distance is set on the basis of a scale of the map image displayed on the display device.

With the route calculation system configured as described above, road sections desired by the user as the pass-through road, in particular, from roads located in the vicinity of the location designated by the operation by the user, can be specified as the roads in the vicinity of the location in accordance with the current display scale of the map.

The invention claimed is:

1. A route calculation system, comprising:
 a display;
 a memory that stores a computer-executable route calculation program; and
 a processor that, when executing the stored program:
  sets a guide route from a departure location to a destination location;
  displays the set guide route on the display superimposed on a map image;
  receives an operation by a user designating a location on the displayed map image;
  measures a time over which the user operation occurs;
  acquires a road status of a road in a vicinity of the designated location;
  selects a pass-through road from among a plurality of candidate roads in a vicinity of the designated location on the basis of the acquired road status, the pass-through road being a road by which the guide route will pass from the road in the vicinity of the designated location, the pass-through road being selected by:
   calculating a candidate cost for each candidate road, the candidate cost being calculated by multiplying at least one of a distance cost, a type cost, and a road status cost by a coefficient, the coefficient being set based on the measured time; and
   selecting the candidate road with the smallest calculated cost as the pass-through road; and
  changes the set guide route to a route that leads from the departure location to the destination location by way of the selected pass-through road.

2. The route calculation system according to claim 1, wherein the processor, when executing the stored program:
 acquires a traffic status or a road surface state of the road in the vicinity of the designated location as the acquired road status.

3. The route calculation system according to claim 1, wherein the processor, when executing the stored program:
 selects the pass-through road with more priority given to a road that is easier to travel through.

4. The route calculation system according to claim 1, wherein the processor, when executing the stored program:
 receives a drag operation by the user performed with a location on the displayed guide route as a start point, an end point of the drag operation being set as the designated location.

5. The route calculation system according to claim 1, wherein the processor, when executing the stored program:
 calculates the candidate cost for each candidate road by multiplying the distance cost by the coefficient.

6. The route calculation system according to claim 5, wherein the processor, when executing the stored program:
 sets the coefficient so that a priority of a candidate road at a short distance from the designated location is increased as the measured time is longer.

7. The route calculation system according to claim 5, wherein:
 the user operation is a touch operation on a touch panel by the user; and
 the processor, when executing the stored program:
  measures a touch pressure on the touch panel for the touch operation; and
  sets the coefficient so that a priority of a candidate road at a short distance from the designated location is increased as the measured touch pressure is stronger.

8. The route calculation system according to claim 1, wherein:
 the road in the vicinity of the location is specified in the unit of section divided by an intersection with a road of the same or higher standard.

9. The route calculation system according to claim 1, wherein:
 the road in the vicinity of the location is a road, a part or entirety of which is included within a predetermined distance from the designated location; and
 the predetermined distance is set on the basis of a scale of the map image displayed on the display device.

10. The route calculation system according to claim 1, wherein a candidate road is determined to be in the vicinity of the designated location when a link of the candidate road is within a predetermined distance of the designated location, the predetermined distance being set based on a scale of the displayed map image.

11. A route calculation method, comprising:
 setting a guide route from a departure location to a destination location;
 displaying the set guide route set on a display superimposed on a map image;
 receiving an operation by a user designating a location on the displayed map image;
 measuring a time over which the user operation occurs;
 acquiring a road status of a road in a vicinity of the designated location;
 selecting a pass-through road from among a plurality of candidate roads in a vicinity of the designated location on the basis of the acquired road status, the pass-through road being a road by which the guide route will pass from the road in the vicinity of the designated location, the pass-through road being selected by:
  calculating a candidate cost for each candidate road, the candidate cost being calculated by multiplying at least one of a distance cost, a type cost, and a road status cost by coefficient, the coefficient being set based on the measured time; and
  selecting the candidate road with the smallest calculated cost as the pass-through road; and
 changing the set guide route to a route that leads from the departure location to the destination location by way of the selected pass-through road.

12. The route calculation system method according to claim 11, wherein a candidate road is determined to be in the vicinity of the designated location when a link of the candidate road is within a predetermined distance of the designated location, the predetermined distance being set based on a scale of the displayed map image.

13. A computer-readable storage medium storing a computer-executable route calculation program, the program comprising:
- instructions for setting a guide route from a departure location to a destination location;
- instructions for displaying the set guide route on a display superimposed on a map image;
- instructions for receiving an operation by a user designating a location on the displayed map image;
- instructions for measuring a time over which the user operation occurs;
- instructions for acquiring a road status of a road in a vicinity of the designated location;
- instructions for selecting a pass-through road from among a plurality of candidate roads in a vicinity of the designated location on the basis of the acquired road status, the pass-through road being a road by which the guide route will pass from the road in the vicinity of the designated location, the pass-through road being selected by:
  - calculating a candidate cost for each candidate road, the candidate cost being calculated by multiplying at least one of a distance cost, a type cost, and a road status cost by a coefficient, the coefficient being set based on the measured time; and
  - selecting the candidate road with the smallest calculated cost as the pass-through road; and
- instructions for changing the set guide route to a route that leads from the departure location to the destination location by way of the selected pass-through road.

14. The computer-readable storage medium according to claim 13, wherein the program further includes instructions so that a candidate road is determined to be in the vicinity of the designated location when a link of the candidate road is within a predetermined distance of the designated location, the predetermined distance being set based on a scale of the displayed map image.

* * * * *